US006295644B1

(12) United States Patent
Hsu et al.

(10) Patent No.: US 6,295,644 B1
(45) Date of Patent: Sep. 25, 2001

(54) METHOD AND APPARATUS FOR PATCHING PROGRAM TEXT TO IMPROVE PERFORMANCE OF APPLICATIONS

(75) Inventors: Wei Hsu, Cupertino; Lacky V. Shah, Sunnyvale, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/375,624

(22) Filed: Aug. 17, 1999

(51) Int. Cl.$^7$ ........................................................ G06F 9/45
(52) U.S. Cl. ........................ 717/9; 717/4; 711/125; 712/227
(58) Field of Search ........................ 717/4, 9, 5; 714/35, 714/38, 45; 711/125; 712/205, 214, 227, 245

(56) References Cited

U.S. PATENT DOCUMENTS

| | | | |
|---|---|---|---|
| 5,355,487 | * | 10/1994 | Keller et al. ............................... 717/4 |
| 5,937,191 | * | 8/1999 | Graham .................................... 717/4 |
| 6,006,033 | * | 12/1999 | Heisch ..................................... 717/9 |
| 6,164,841 | * | 12/2000 | Mattson, Jr. et al. ................... 717/5 |
| 6,185,669 | * | 2/2001 | Hsu et al. ............................. 712/205 |
| 6,189,141 | * | 2/2001 | Benitez et al. ............................ 717/4 |
| 6,223,339 | * | 4/2001 | Shah et al. ............................... 717/5 |

OTHER PUBLICATIONS

IBM Technical Disclosure Bulletin, "Branch Exception Mechanism", vol. 33, No. 10B, Mar. 1991, pp. 486–488.*
Smith & Hsu, "Prefetching in Supercomputer Instruction Caches," Proceedingéof IEEE Supercomputing '92, Nov. 16–20, 1992, pp. 588–597.*
Lebeck & Wood, "Cache Profiling and the SPEC Benchmarks: A Case Study," IEEE Computer, vol. 27, Issue 10, Oct. 1994, pp. 15–26.*
IBM Technical Disclosure Bulletin, "Automatic Program Reordering for Data References in Unified Cache," vol. 39, No. 04, Apr. 1996, pp. 117–118.*
Merten et al., "A Hardware–Driven Profiling Scheme for Identifying Program Hot Spots to Support Runtime Optimization," Proceedings of the 26th International Symposium on Computer Architecture, May 2–4, 1999, pp. 136–147.*

* cited by examiner

Primary Examiner—Tuan Q. Dam

(57) ABSTRACT

The present invention relates to a method and an apparatus for patching program text to improve performance of applications running on a computer through the elimination of table lookup and emulation.

15 Claims, 3 Drawing Sheets

METHOD AND APPARATUS FOR PATCHING PROGRAM TEXT TO IMPROVE PERFORMANCE OF APPLICATIONS

TECHNICAL FIELD OF THE INVENTION

This invention relates to a method and an apparatus and article of manufacture for improving the performance of computer applications or programs via the use of an optimizer which avoids the utilization of excessive emulation and lookup tables by patching selective program text to directly access the code cache.

BACKGROUND OF THE INVENTION

Prior art systems for improving the performance of applications (i.e. run time optimizations) may be based on one of several approaches. One approach is to provide compilers known as "optimizers" or "optimizing compilers" which serve to improve the run time of a given application while it is executing. In prior art approach, the compiler software or runtime optimizer takes complete control of the existing binary. The runtime optimizer then determines which code is used most often (i.e. the "hot code"), translates the hot code, and emulates the remaining code. When branches are encountered in the emulated code, the target address is checked to see if there is a translation. If there is a translation, the system will execute the translated code instead of the original code.

In the prior art approaches to the running of an application on a computer, the binary of a computer application is not actually executed. This is because the emulator controls the process, such that the emulator actually emulates the existing binary and checks on each control transfer instruction (branch, call, return, etc.). However, this approach is problematic because the system needs to translate a lot of code to get the requisite speed. If the system has certain code and does not translate it, it will emulate that code, in which case a prior art system will spend too much time on the given task.

Such a system is expressed in FIG. 4. FIG. 4 depicts prior art run-time optimizer 130. The control loop 131 begins execution of a block of program code via emulation performed by the profiling emulator 132. The profiling aspect of emulator 132 allows the control loop 131 to track the number of times the particular block of code has been executed via emulation. Note that a run-time optimization system is different from a run-time binary translation system, in that the latter is usually for architecture migration while the former is to decrease execution time. The run-time optimization system is using the emulator 132 for profiling in order to guide optimizations, i.e. the code is running on its native system. After a predetermined number of executions via emulation, the control loop 131 designates the block of code as hot code, and thus, desirable for optimization. The control loop 131 then activates trace selector 133 to form a trace and then translate/optimize the formed trace. The trace selector 133 forms a trace of the instructions that comprise the block of code by following the instructions in the block. When a branch instruction is encountered, the trace selector makes a prediction as to whether the branch is taken or falls through. If the selector decides the branch is mostly taken, then the trace is formed by extending the code from the branch target block. If the selector decides not to take the branch, then the branch falls through, and the trace continues within the fall through block. The trace terminates at a backward branch predicted to be taken or when the trace becomes sufficiently large. After the trace is completed, the code is rewritten with machine dependent and machine independent optimizations. The optimized code is then placed into the code cache 134. The next time the control loop 131 encounters a condition to execute this block of code, then the control loop 131 will execute the code in the code cache 134 and not emulate the code via emulator 132.

As shown in FIG. 5, if the target of a branch which is taken to exit trace 1, as shown by branch instruction 141, then control is returned to the run-time system optimizer 130 and to control loop 131, which determines if the target resides in the code cache. If the target resides in code cache, then the control loop 131 modifies the target of the branch instruction 141 to be the trace 2 in 142 in code cache as shown by branch instruction 143. This modification is called backpatching. Thus, if the exit of the trace is already translated, then the branch is backpatched such that a subsequent execution will directly branch to the new trace without returning to the control loop. Backpatching increases the speed of execution of the code, because returning to the control loop significantly slows down execution time.

A particular problem with the prior art optimizer is that it cannot backpatch an indirect branch. The optimizer cannot backpatch an indirect branch because the target address is unknown. The target address is typically in a register or memory location and not written directly in code. Thus, the optimizer will shift control back to the control loop 141 to determine whether the target address has been translated, which is expensive in terms of time. The prior art has attempted to minimize this problem by inlining a code sequence to search a smaller lookup table in the optimized traces, however, these mechanism still incur high overhead. Without such a lookup, the branch will switch execution back to the original binary, and not return to trace execution. Moreover, if small table lookup fails then the execution will shift control back to the control loop, as described above. Examples of indirect branches are return branches and switch branches.

Another problem with the prior art optimizer is that it attempts to translate any code that is deemed hot based on a small threshold. A higher threshold would incur too much overhead while a lower threshold would end up with traces in poor quality, i.e. too many traces, and traces with early exits. Thus, it is rather difficult to come up with an ideal threshold value. Note that emulation time overhead is such that a higher threshold would require the code to be emulated much longer before they get a chance to be translated. Without a translation, the execution of the trace would be performed by software simulation or emulation. However, given that emulation is necessarily slow, all hot code is usually translated but this can present a problem, some traces are very difficult to translate. For example, it is difficult to translate a trace with branches in the delay slot of another branch. The requirement of translating all hot code therefore increases the translation time and complexity.

Hence, there are several drawbacks to this approach. This type of prior art system necessitates emulation of the code regions of the application that have not been translated, or otherwise requires the translation of every region the very first time it is encountered. This adds significant overhead because both emulation and translation are slow. Moreover, a system cannot effectively optimize every trace identified as "hot." Some traces in the prior art optimizer cannot be optimized to run better than the original sequence. Moreover, optimization of some traces results in a reduction of performance after the optimization because the approach of the prior art must handle indirect branches efficiently in the optimized traces. For example, in PA 8000 systems made by the Hewlett-Packard Corporation of Palo Alto, Calif. (USA), procedure return branches are usually mispredicted by hardware. An effectively selected trace, which successfully predicted the target of a return branch could save misprediction cost, say about 5 cycles. However, for other architectures, such as the implementation of the new IA-64 architecture, where return branches will often by correctly predicted by return branch stack, the overhead of handling return branches would cost more than a correctly predicted branch. Hence, the approach in prior art is more suitable for architectures with expensive return branches, but not suitable for architectures with inexpensive return branches.

The second problem with the prior art concerns the necessity for yet another table lookup. When a prior art type system handles indirect branches, there are several possibilities for resolving the branch. One possibility is to proceed back to the control loop, where a system will necessarily take a big hit in cycles because such a process takes many cycles just to complete the lookup on the table of hot code. As similarly detailed above, in order to minimize such a cost in cycles, software systems often use something like a small lookup table called a software cache 24 (FIG. 2). A smaller table is used so that the system need not go back to the control loop. This routine essentially locates a smaller table to see whether the system can garner the hit from the small table. However, even with such a provision, the prior art system still pays, on the average, approximately 10 cycles even if there is a hit. If there is no hit however, then 10 cycles will be wasted, and the prior art system still needs to go back and locate a big table for lookup. Such is the overhead associated with indirect branches.

Yet another problem is associated with the prior art approach. The prior art systems necessarily translate too much code. This is problematic because systems already have a lot of space taken by the existing binary and this necessitates the production of a lot of translated code. The particular system of the prior art further teaches the use of an emulator is necessary for the handling of a branch because a system needs to know whether there is a translation for the target address. Hence, it is necessary to have a specific element in control, so that every time an address is handled, the system can look into the existing mapping table to see whether there is translation. Using an emulator tailored for the purpose of emulating the code and figuring out which code is "hot" can actually serve two purposes. One for control in determining whether the system should continue emulating, or whether it should jump to the new code cache and execute the improved code. The second purpose is to profile (i.e., to figure out whether a given segment of code is "hot" or relatively unused). However, profiling in the prior art becomes problematic because some code segment executes say, 100,000,000 times, while other segment's code executes only a couple thousand times, thereby making it difficult to categorize whether the code which executes only 2,000 times as "not hot" simply because it executed "only" a few thousand times when compared to the multitude of code out there which might execute many millions of times. However, in trying to determine out whether the code is "hot" or not, a system cannot afford to consider just this type of relevant frequency.

SUMMARY OF THE INVENTION

These and other objects, features and technical advantages are achieved by the present invention which is accordingly directed to the use of a method, apparatus and article of manufacture for patching program text which can replace native binary during specifically profiled "hot" traces. Use of this system improves performance of applications by reducing run time through the disclosed technique of selective optimization. In particular, the present system provides for a way to avoid the table lookups because the present system simply need not use any lookup tables given that the control transfer is embedded in the binary. When the present system hits the designated code (i.e. the "hot" code), there is a branch that will branch out, but there is no need to handle a table lookup command.

With the system of the present invention, the inefficiencies inherent in the prior art are ameliorated. For example, if there is an indirect branch in the optimized trace, the present system process will direct execution back to the existing binary, which is in contrast to the prior art where, for each indirect branch in the trace, the system must go through a sequence of steps such as prediction/table lookup/ back to control loop. Hence, each time the presently contemplated system hits a set of "hot" code, there will be a branch that will lead into the code cache to do the improved code such that the use of a lookup table is avoided. Therefore, in the case of indirect branch, the contemplated system simply executes "as is."

Thus, the present invention, however, makes the most of the native binary by leveraging because it only translates the most critical part, because all the other parts of the binary can remain the same, and the system will execute the binary, such that when the system hits an important part, it branches out, thereby making it necessary only to generate some code for important parts which will directly (i.e. without the use of any lookup tables) branch out to the code cache to execute.

Accordingly, the present system is directed to remedying the prior art inefficiency because the profiler makes a determination of what code to translate based specifically on sampling of hardware performance monitor registers. Hence, the present system avoids inefficient profiling and translation of the prior art systems.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a brief overview of the present invention, and the advantages thereof, reference is now made to the following descriptions taken in conjunction with the accompanying drawing, in which.

DETAILED DESCRIPTION OF THE INVENTION

To address the aforementioned drawbacks of the prior art, the approach provided for by the present invention is the provision of a system which does not maintain control throughout.

Figure 1:
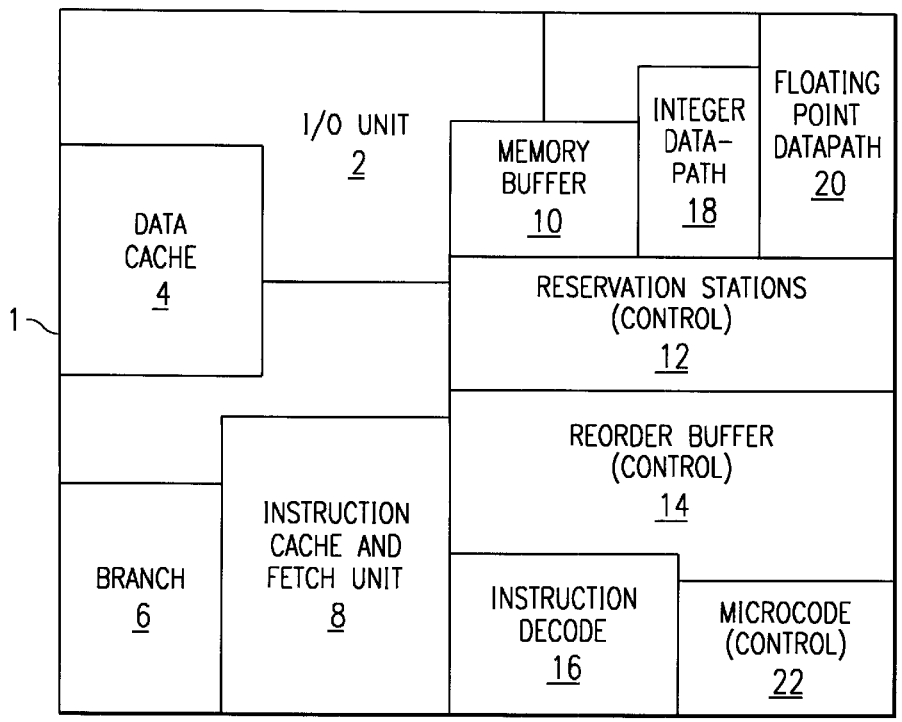
FIG. 1 is a block diagram of the structure of a microprocessor in a computer upon which such an application would run.
Figure 2:
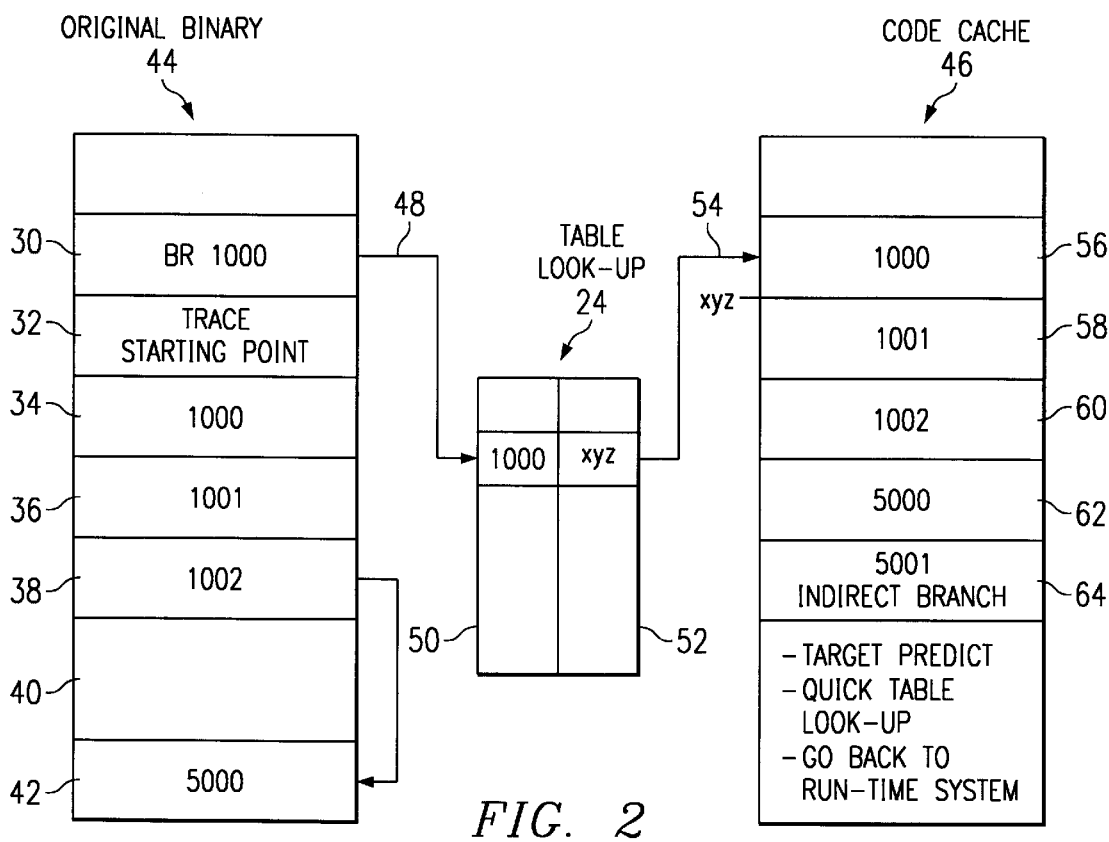
FIG. 2 is a diagrammatic representation of the procedure used in the prior art systems involving table look ups.
Figure 3:
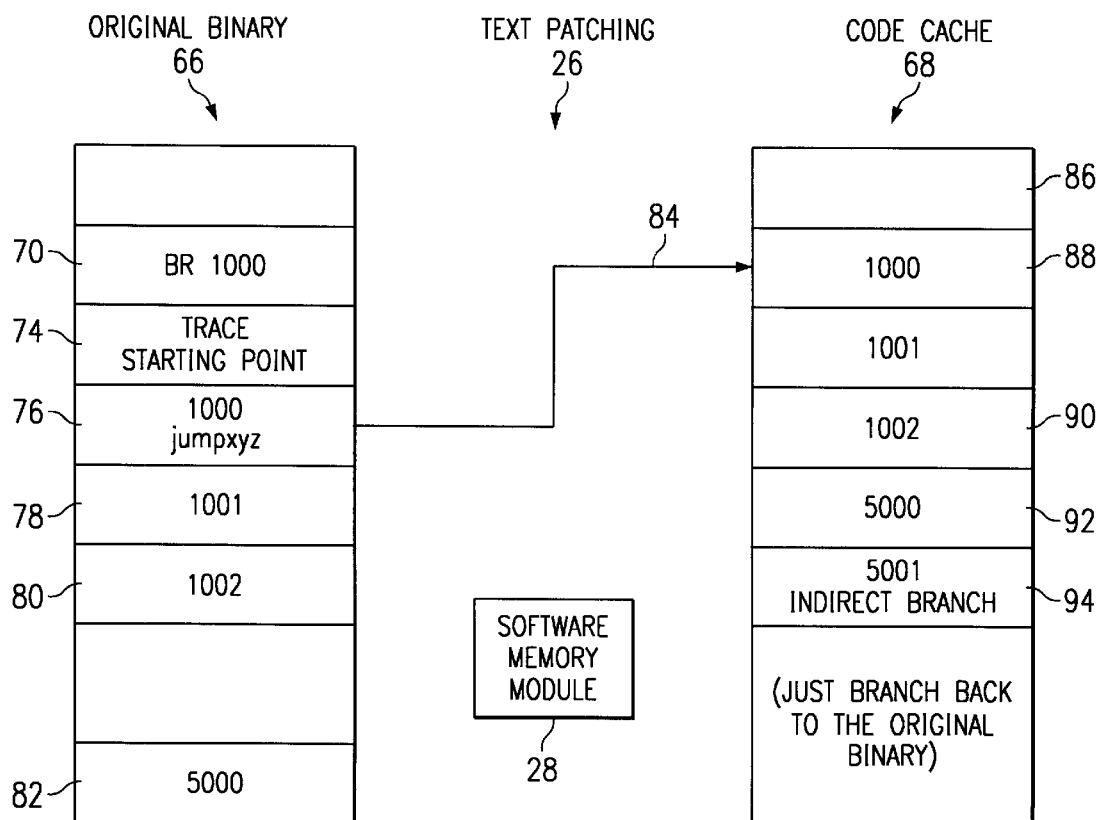
FIG. 3 is a diagrammatic representation of the procedure used in the system contemplated by the present invention.

The contrast between the present invention and the control inherent in the prior art systems is best explained with the contrasting reference of FIG. 2, (which details the reliance on table lookup 24 which is utilized in the prior art status control methodology) and FIG. 3 (which details the elimination of such a look up table). In FIG. 2, the original binary 44, when encountering a branch ("br," at address 1000) indicated at step 30, begins a trace at starting point 32, proceeds to table lookup 24 via path 48 to (address location 1000), indicated at step 50, to determine the corresponding identity (xyz), indicated at step 52 via path 54, the Code Cache 46 (address location 1000) indicated at step 56, from which the target may be predicted and the mechanism may return to the run time system.

By contrast, the present system or method generally permits an application to run natively on a microprocessor which collects profile information using performance monitor counters, and can perform jump step 76 from the native binary 66 according to patches on targeted "hot" traces according to a software memory module 28 (FIG. 3). When "hot" traces (i.e. translated code segments) are identified, the present system can patch the original executable at the first instruction of the trace 74 and then transfer the control from the patched instruction to an optimized trace via path 84, thus leveraging the existing binary as much as possible. All exits thereafter from the optimized trace including indirect branches at 94 point back to the native application in 66. As further detailed in the code below, which is cross referenced in FIG. 3:

| 0x100 | nop  | 1d.4 | sub  |
| 0x110 | Id.8 | add  | br   |
| 0x120 | st.8 | br   | call |

The system contemplated identifies a hot trace beginning at 0x110 (i.e. through a previously executed optimization process such as trace selection, and then replaces the bundle at 0x110 with a branch jumping (i.e. along path 84) to the optimized trace, represented below as:

| 0x100 | nop  | 1d.4 | sub |
| 0x110 | nop  | nop  | br 0xff0 → jump to the code cache |
| 0x120 | st.8 | br   | call | wherein the starting bundle of the optimized trace in the code cache is:

0xff0 1d.8 add br

Generally, this approach addresses all of the problems in the prior art mentioned above. With this approach the contemplated system need only translate a limited number of traces where it is believed it can significantly improve performance based on the (previously executed) profiling. This not only helps reduce the system overhead but it also helps improve reliability, because the system need only deal with just a few translations and can thereby let all non-targeted (i.e. non-"hot") traces run natively. With this approach, the present system permits all indirect branches be as they were so that such indirect branches will automatically jump to the original executable. If any potential target of an indirect branch falls on a "hot" trace, the system can patch that target to jump back to another trace in the code cache. Even though this model necessitates the overhead of an additional unconditional branch for every indirect branch, this is nevertheless, a much smaller cycle overhead than the overhead necessitated under the prior art approach.

The preferred embodiment of the present system or method will accordingly be used to rewrite application binaries to improve their performance when the load on the system is low. This will generally be more efficient than doing the patch transformations of the code or signals at runtime. Instead of patching the application text at runtime, a given system can simply collect the necessary profile information at a trial runtime and use that information later (i.e., during a real run time) to transform the code or signals (i.e., rewrite the binary with optimized traces). The first instruction of the trace can be patched to point to the optimized trace, and all exits from the trace can be made to point back to the original executable. Hence, the rewritten binary will, in a preferred embodiment, consist of the original text with instructions replaced by branches 70 pointing to the optimized traces and a code cache 68 consisting of optimized traces (see FIG. 3).

After monitoring the execution for some time, the system can determine that certain portions of the code are hot, at which point the system can generate an optimization of the trace 74 in order to optimize the application. Next, the system generates a branch 70 in order to improve the loop or code. However, it is important to recognize, that in the context of this, that the patching described herein can be applied to both off-line translation and on-line (i.e., on the fly) translation. As it pertains to off-line translation, the system can profile the execution of a program several times to accumulate sufficient profiles. With respect to run-time translation, the system can profile the execution for a few seconds to determine where the hot code is located. Nevertheless, despite the different profiling, the optimization and patching are the same in both cases.

Once this procedure is finished, the process then returns to the native code in 66 which will continue routing as originally contemplated by the (native) computer application. Thus, it is only occasionally—such as when the system encounters a difficult code portion—that the system will branch out to do the transformation of the code. Each time after having finished improving a given segment of code, the system returns to the native binary. This may repeat itself several times within the course of execution, whenever a new section of code emerges as hot. Again, it is important to recognize that the system contemplated herein applies not just to the run-time translation described above, but also to off-line translation. In off-line translation, the system profiles the program, and if the profile indicates that some codes are hot, but have not improved traces generated, then the static translator will be invoked to translate them.

By way of example, if one were to consider an application that has say, only two big loops, and other code portions are only executed infrequently, the system contemplated would not really need to translate most of the code of the entire application, but instead, would only need to translate those two loops and let the program run "as is" for the remainder of the execution of the application. Thus, the contemplated method "kicks" in when it hits those loops, at which point the system will jump out to improve the loop code. Thusly provided for, the present invention solves the aforementioned prior art problems by reducing the overall run time through the use of optimized translation and emulation.

By way of further detail, when binary code in the present system is executing, it is representative of a process that is performance monitored with respect to the execution of the program. The hardware performance monitoring features may be of any type as known in the art, but will preferably have information about the latest branch instructions. A trace of branches can be used to identify hot codes and hot execution paths. Once the system collects enough of a profile, then the profile information can be used to select the important traces.

Given such provision, the system can identify which code executes more frequently than others, and starting with that code, can look at a branch prediction to grow the trace. With continuing general reference to FIG. 3, once the trace 74 has been filled out, the system passes the trace to the optimizer, the optimizer optimizes the trace 74, and writes the trace 74 into the code cache 68. Next, the existing binary in 66 is attached, starting from the improved trace with a branch 70, and a jump 76 is made to the imported trace in the code cache, which is where the control is embedded into the existing binary. Thereafter, the system just resumes the execution of the binary 66 until a "hot" trace is hit, at which point the system will automatically jump into the code cache 68 to do the improved trace.

By way of further detail, the rewriting of the binary is done by the software based optimizer wherein the original binary inserts a special form of branch instruction which will reach the code cache. This special form of branch is accomplished by a long branch instruction. Such an approach obviates the need for an emulator to monitor each process as it is executing and running, because the system only needs to monitor the execution to determine where the hot code is. Thusly executed, the system dispenses with the need for complete control because the control is inserted into the binary.

When the optimized trace is removed from code cache 68, (i.e., such as when certain code becomes "hot," and there is not enough room on code cache 68), a trace beginning "xyz" will be thrown out. In such a case, the system has to patch back the instruction that was removed by looking at information saved on the side, but even this is usually not necessary because the contemplated system does not have to translate that many traces, the omission of which leaves the code cache sufficiently large, unlike the prior art where it is necessary to translate too many things such that the system necessarily runs out of space, thereby effectuating the revocation of old traces.

In the preferred embodiment, such methodology will yield a translation range of probably only one to five percent of the code, in direct contrast the prior system which would translate virtually everything. In the present approach, in order to avoid too much emulation, the hardware therefore performs monitoring by letting the program run and taking some samples. Without the use of any emulation, the system takes some samples, and the profiling determines which code is more important than the other. In a preferred embodiment, this determination is based on relative frequency wherein the sample is taken on the basis of time intervals. Given the many ways in which the system can sample, the preferred embodiment teaches that the system will use time intervals, such as 100th of a second, or will base the interval on every 10,000,000 instructions executed or even based every time the system hits 500 cache misses, in which case there will be an interrupt to inform the system to take a sample.

Accordingly, the starting bundle of a trace in the original binary is modified (i.e., patched) to be an unconditional jump to the target trace in code cache 68. Should there be any branches to this trace starting bundle, the branches will be re-directed to the target trace in the code cache 68 through a patch. This patch must be done in one bundle because the next bundle could be the target of other branches. Hence, the system provides for the use of a long reach unconditional branch, rather than the use of an indirect branch code sequence. While text-patching is possible in almost any architecture, it may be difficult for x86 code because x86 instructions are variable length, and is generally easier in pure RISC architecture such as the PA™ type, but, nevertheless, given the very limited reachability of that type of RISC architecture, the preferred embodiment contemplates use in an application running on IA-64 architecture. The long branch instruction of the IA-64 architecture provides a unique opportunity for text patching because the long branch instruction can reach anywhere in the complete 64 bit address space. Although the contemplated system may be implemented on many different operating systems (such as HP-UX™ other Unix variants, etc.), in the preferred embodiment the system will run on flat-address model operating systems such as WIN™/NT™, which will provide optimal efficiency in allocating code cache text in the same region because it is easy to compute the offset for the patching long branch to reach the code cache.

With the thusly articulated text-patching, indirect branches in traces can now execute natively and branch back to the original binary for optimal efficiency of application execution. If the execution continues into a "hot" spot, the first patched bundle would bring the execution back to code cache. This approach not only minimizes the overhead associated with indirect branches, but also allows us to leverage the original code as much as possible. In many cases, the contemplated system could leave the execution in native code without generating a trace. In a traditional trace-level run-time optimizer, there is a control loop that determines whether the execution should go to a translated/ optimized trace. While the control of the contemplated system of text patching is embedded in the original binary, so shared text and shared library may need to be mapped as private depending on the system set-up. Because it is important to provide for a given application to "go native" at any indirect branch in the code cache, the preferred embodiment of the contemplated system will ensure that every architectured register contains the correct contents at each indirect branch point by not destroying the content of live registers.

Figure 3A:
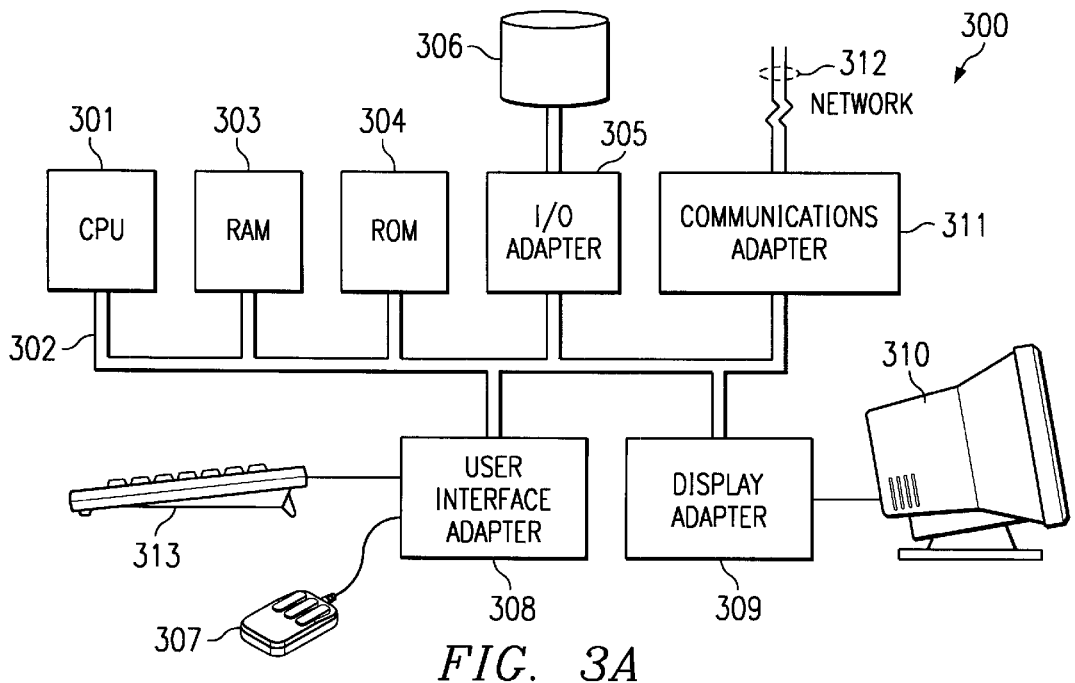
FIG. 3A is a block diagram and representation of a computer system adapted to implement the inventive procedure of FIG. 3.
Figure 4:
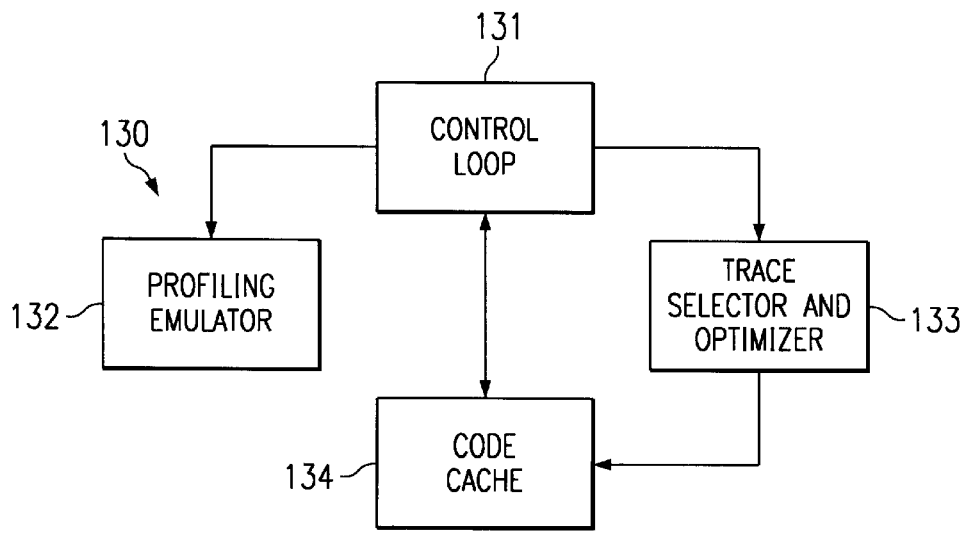
FIG. 4 depicts a prior art software emulation RTS.
Figure 5:
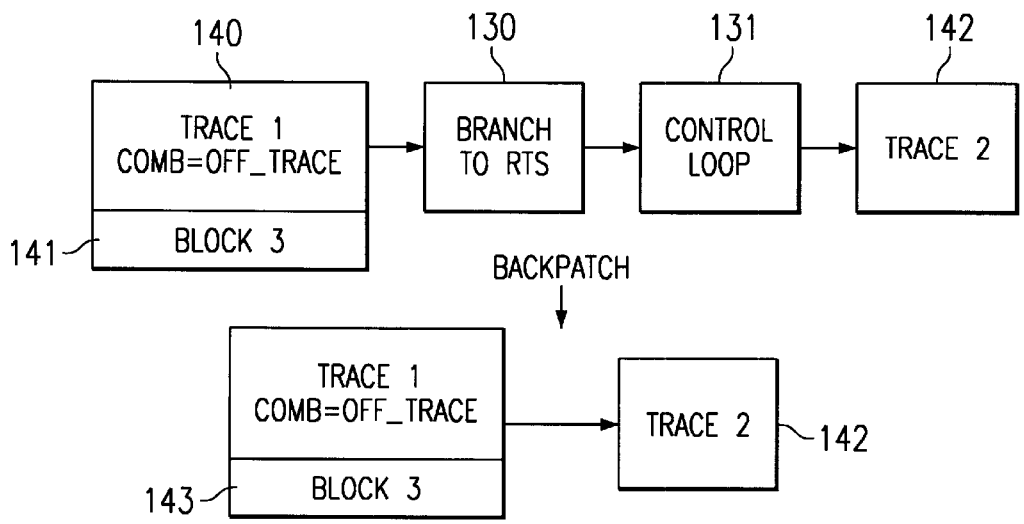
FIG. 5 depicts a prior art backpatching mechanism that is used with the system of FIG. 4.

FIG. 3A illustrates computer system 300 adapted to use the present invention. Central processing unit (CPU) 301 is coupled to bus 302. In addition, bus 302 is coupled to random access memory (RAM) 303, read only memory (ROM) 304, input/output (I/O) adapter 305, communications adapter 311, user interface adapter 308, and display adapter 309. Note, ROM 304 may be PROM, EPROM, or EEPROM. Also note, RAM 303 may be SRAM, DRAM, or SDRAM.

RAM 303 and ROM 304 hold user and system data and programs as is well known in the art. I/O adapter 305 connects storage devices 306, such as a hard drive or a CD ROM drive, to the computer system. Communications adaption 311 is adapted to couple the computer system to a local, wide-area, or Internet network 312. User interface adapter 308 couples user input devices, such as keyboard 313 and pointing device 307, to computer system 300. Finally, display adapter 309 is driven by CPU 301 to control the display on display device 310. CPU 301 may be any general purpose CPU, such as an HP PA-8200. However, the present invention is not restricted by the architecture of CPU 301 as long as CPU 301 supports the inventive operations as described herein.

Although the present invention and its advantages have been described in detail, it should be understood that various changes, substitutions and alterations can be made herein without departing from the spirit and scope of the invention as defined by the appended claims.

What is claimed is:

1. A method of converting signals of program text for improving the performance of an application comprising the steps of:
    (a) profiling information using performance monitor counters;
    (b) running said application in a native state;
    (c) identifying hot traces based on said profiling of said information;
    (d) patching and optimizing an original executable of said application at a first instruction of at least one hot trace;
    (e) transferring control from said first instruction to an optimized trace;
    (f) executing said control of said optimized trace;
    (g) exiting from said optimized trace; and
    (h) returning said control to said native state of said application.

2. The method as defined in claim 1, wherein said patching enables direct access of said optimized trace in a code cache.

3. The method as defined in claim 1 wherein step (b) is performed on a computer that is based on a RISC type architecture with instructions having a fixed size.

4. The method as defined in claim 3 wherein said RISC type architecture is that of the IA-64 architecture.

5. The method as defined in claim 1, wherein said identifying of said hot traces results in the identification of approximately 1–5% of the code as hot traces.

6. An apparatus for converting signals of program text for improving the performance of an application which comprises:
    (a) a module for profiling information using performance monitor counters;
    (b) a module for running said application in a native state;
    (c) a module for identifying hot traces based on said profiling of said information;
    (d) a module for patching an original executable of said application at a first instruction of at least one hot trace;
    (e) a module for transferring control from said first instruction to an optimized trace;
    (f) a module for executing said control of said optimized trace;
    (g) a module for exiting from said optimized trace; and
    (h) a module for returning said control to said native state of said application.

7. The method as defined in claim 6, wherein said patching enables direct access of said optimized trace in a code cache.

8. The method as defined in claim 6, wherein step (b) is performed on a computer that is based on a RISC type architecture.

9. The method as defined in claim 8, wherein said RISC type architecture is that of the IA-64 architecture.

10. The method as defined in claim 6, wherein said identifying of said hot traces results in the identification of from approximately 1–5% of the code as hot.

11. An article of manufacture having a computer readable code module for converting signals of program text for improving the performance of an application which comprises:
    (a) a module for profiling information using performance monitor counters;
    (b) a module for running said application in a native state;
    (c) a module for identifying hot traces based on said profiling of said information;
    (d) a module for patching an original executable of said application at a first instruction of at least one hot trace;
    (e) a module for transferring control from said first instruction to an optimized trace;
    (f) a module for executing said control of said optimized trace;
    (g) a module for exiting from said optimized trace; and
    (h) a module for returning said control to said native state of said application.

12. The method as defined in claim 11, wherein said patching enables direct access of said optimized trace on a code cache.

13. The method as defined in claim 11, wherein step (b) is performed on a computer that is based on a RISC type architecture.

14. The method as defined in claim 13, wherein said RISC type architecture is that of the IA-64 architecture.

15. The method as defined in claim 11 wherein said identifying of said hot traces results in the identification of from approximately 1–5% of the code as hot.

* * * * *